United States Patent Office 3,166,891
Patented Jan. 26, 1965

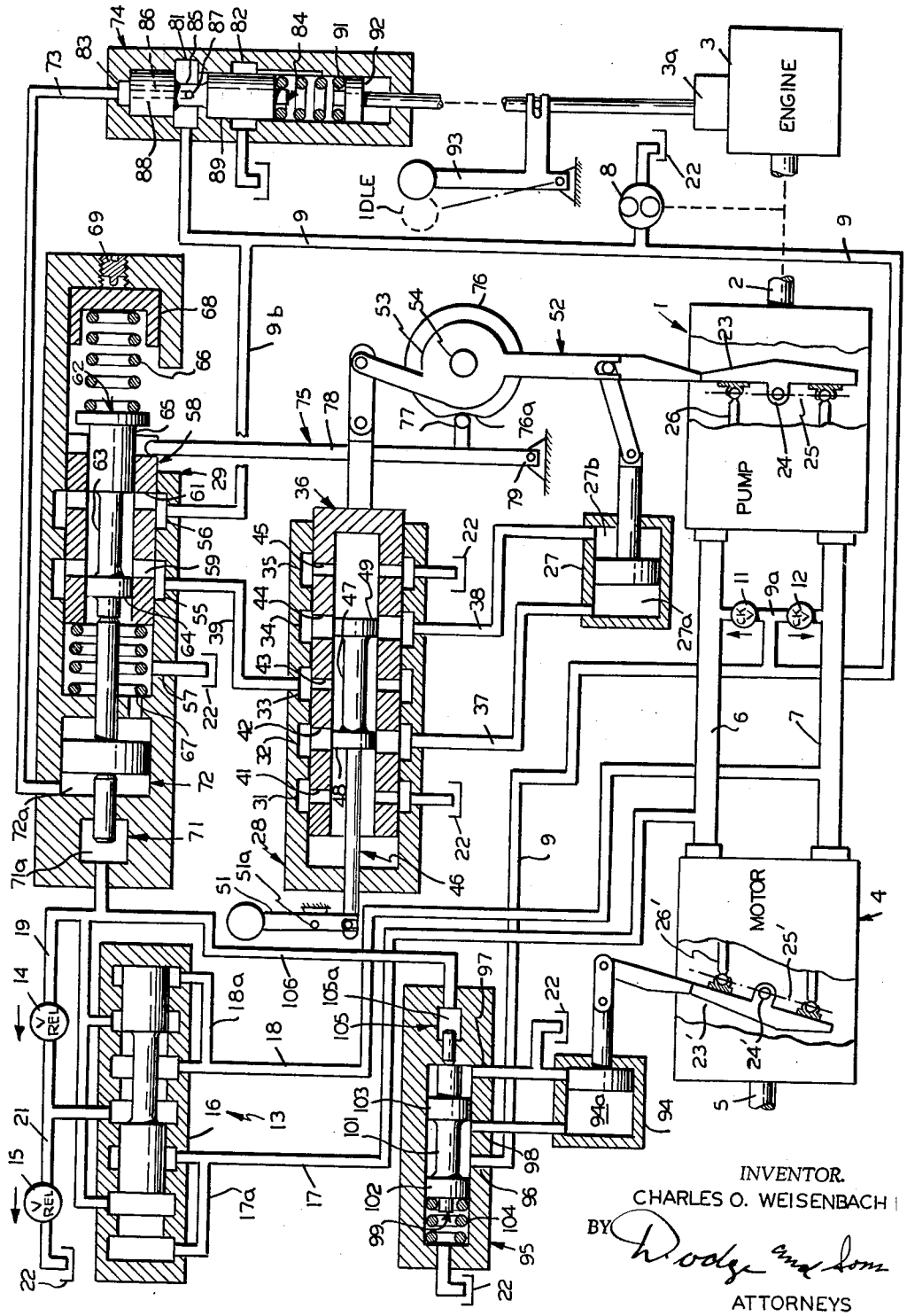

3,166,891
HYDROSTATIC TRANSMISSION
Charles O. Weisenbach, Watertown, N.Y., assignor to The New York Air Brake Company, a corporation of New Jersey
Filed July 8, 1963, Ser. No. 293,538
9 Claims. (Cl. 60—19)

This invention relates to hydrostatic transmissions and particularly to controls therefor.

A typical hydrostatic transmission includes a variable displacement hydraulic pump which is driven by a prime mover, such as an internal combustion engine, a hydraulic motor, and a pair of main conduits connecting the pump and motor in a closed transmission circuit. The transmission is provided with a primary control, frequently manually actuated, which regulates the displacement of the pump, and, in reversible transmissions, also the direction of flow through the pump, and a secondary override control that responds to the operating pressure in the transmission and limits the displacement selected by the primary control. The action of the override control automatically prevents the transmission from imposing a stalling load on the prime mover.

The object of this invention is to provide a hydrostatic transmission incorporating improved controls for selecting and limiting the displacement of the transmission pump. According to the preferred form of the invention, in which the transmission is reversible, the displacement control element of the pump is biased toward a zero displacement position and is moved from that position in opposite directions toward either a maximum forward displacement position or a maximum reverse displacement position by a position-responsive servo control comprising a double-acting control motor and a primary control valve of the follow-up type. The primary control valve includes a pair of movable valving members, one of which is the input member and initiates primary control action, and the other of which is the follow-up member and is positioned by the control motor. The two valving members have a first relative position, termed the null position, in which each side of the control motor is in restricted communication with both a supply passage and an exhaust passage, and are shiftable in opposite relative directions from that null position to isolate a selected side of the control motor from the exhaust passage and to isolate the remaining side from the supply passage. The supply passage is connected with a source of control fluid under pressure through an override control valve, which also is of the follow-up type, and which comprises an input valving member that is actuated by motor means that responds to the operating pressure in the closed transmission circuit, and a follow-up valving member that is positioned by the servo motor. The two valving members of the override control valve have a first relative position, termed the supply position, in which the supply passage is connected with the source, a second relative or vent position in which the supply passage is connected with the reservoir, and an intermediate relative position, termed the lap position, in which the supply passage is isolated from both the source and the reservoir. When the override valve is in lap position it prevents the primary control from increasing pump displacement and when it is in vent position it prevents the primary control from maintaining the displacement control element in the selected position and allows that element to float toward a reduced displacement position under the action of the biasing force. The follow-up valving member of the override control valve is moved toward the vent position relative to the input member as the displacement control element moves away from zero displacement position, and the input member is moved toward the same position as operating pressure rises. Therefore, the maximum operation pressure established by the override control decreases as displacement increases. The follow-up connection for the follow-up valving member of the override control valve incorporates a cam which is moved by the servo motor and a follower which shifts the valving member, and it is this mechanism which determines the limiting relationship between pressure and displacement maintained by the override control. With this arrangement, the power requirements of a particular installation can be matched easily simply by changing the shape of the cam.

In the preferred embodiment, the input valving member of the primary control valve has a range of motion greater than that of the follow-up valving member. Therefore, when the input valving member and the displacement control element are in either of their maximum displacement positions the follow-up valving member will be unable to assume a null position with respect to the input valving member and the pressurized side of the control motor will remain in free communication with the supply passage. This elimination of the null position of the valving members in the maximum displacement positions of the primary control valve allows more rapid venting of the control motor when the override control valve is in its vent position. Thus, the response rate of the override control is greatest at those times when overload conditions are potentially the most dangerous.

This embodiment also includes mechanism for regulating the power demand of the transmission in direct relation to the speed of the engine. This mechanism comprises second fluid pressure motor means which acts on the input member of the override control valve in the same sense as the first fluid pressure motor means, and a pressure regulating valve which is actuated by the engine throttle and which serves to increase and decrease the pressure in the second fluid motor as the throttle is moved in speed-decreasing and speed-increasing directions, respectively. Since the two override motor means act in the same sense, it is apparent that the second motor means has the effect of varying the power demand of the transmission in direct relation to engine speed.

The preferred transmission also includes a known relief circuit that comprises a low pressure relief valve, a high pressure relief valve that discharges to the low pressure valve, and a shuttle valve that responds to the pressure differential between the two main conduits and connects the higher pressure conduit with the high pressure relief valve and connects the lower pressure conduit with the low pressure relief valve. However, here the shuttle valve of the relief circuit also serves to connect the first override motor means with the high pressure side of the closed circuit.

The preferred embodiment of the invention is described herein with reference to the accompanying drawing whose single figure is a schematic diagram of the complete transmission suitable for use in driving the wheels of a vehicle.

As shown in the drawing, the transmission comprises a variable displacement pump 1 having a drive shaft 2 which is connected in driven relation with the output shaft of an engine 3, a variable displacement motor 4 whose drive shaft 5 is connected with the wheels (not shown) of a vehicle, and a pair of main conduits 6 and 7 which connect the pump and motor in a closed transmission circuit. Engine 3 also drives a charge pump 8 which delivers fluid to the main conduits 6 and 7 through conduit 9 and branched conduit 9a containing check valves 11 and 12, and thus serves to maintain the transmission circuit liquid-filled. The pressures in the two main conduits are limited by a relief circuit 13 which is of the type disclosed in U.S. Patent 2,961,829, issued November 29, 1960, and which includes high and low pressure relief valves 14 and 15, respectively, and a shuttle valve 16. The shuttle valve is connected with the main conduits 6 and 7 through conduits 17, 17a, 18 and 18a, and serves to connect the main conduit containing the higher pressure with the conduit 19 leading to the inlet of high pressure relief valve 14 and to connect the other main conduit with the conduit 21 leading to the inlet of the low pressure relief valve 15. The outlet of high pressure relief valve 14 is connected with conduit 21 and the outlet of low pressure relief valve 15 is connected with reservoir 22 by a flow path (not shown) that leads through the casing of motor 4 and, if necessary, through a heat exchanger.

Transmission pump 1 is of the rotary cylinder barrel, longitudinally reciprocating piston type and includes a cam plate 23 which is angularly adjustable about the axis of trunnion 24 between maximum displacement positions on opposite sides of the illustrated zero displacement position. The axis of trunnion 24 is normal to the axis of rotation of pump 1 and intersects that axis in the plane 25 containing the centers of the spherical heads of pistons 26. As a result, the reaction forces exerted by the pistons 26 urge the cam plate 23 toward the zero displacement position when pump 1 is pumping. Cam plate 23 is shifted in opposite directions from the illustrated position by a double-acting piston motor 27 which is controlled by the primary and override control valves 28 and 29, respectively.

Primary control valve 28 comprises a housing containing a valve bore which is intersected by five spaced, annular chambers 31–35 and which contains a reciprocable valve sleeve 36. Annular chambers 31 and 35 are in continuous communication with reservoir 22, annular chambers 32 and 34 are connected with the opposed working chambers 27a and 27b of motor 27 by conduits 37 and 38, and annular chamber 33 is connected with a supply conduit 39. Valve sleeve 36 is formed with five spaced sets of radial passages 41–45 which register, respectively, with annular chambers 31–35, and contains a reciprocable valve plunger 46 formed with an annular groove 47 that defines a pair of lands 48 and 49. Lands 48 and 49 are slightly narrower than passages 42 and 44, respectively, so that when plunger 46 is in a null position (such as the one illustrated) relative to sleeve 36, each of the outlet chambers 32 and 34 communicates with supply chamber 33 and one of the exhaust chambers 31 or 35. Valve plunger 46 is shifted in opposite directions from the illustrated neutral position with respect to the housing of valve 28 by a lever 51, and valve sleeve 36 is shifted in opposite directions from the illustrated position by motor 27 through a follow-up connection 52, including a crank 53 which is pivoted at 54. The parts are so adjusted that valve plunger 46 and sleeve 36 are in a null position when lever 51 is in its neutral position and cam plate 23 is in its zero displacement position.

Override control valve 29 comprises a housing formed with a valve bore intersected by a pair of spaced annular chambers 55 and 56 and an exhaust port 57 and containing a reciprocable valve sleeve 58. Annular chamber 55 is connected with supply conduit 39, annular chamber 56 is connected with charge pump 8 via conduits 9 and 9b, and exhaust port 57 is in continuous communication with reservoir 22. Valve sleeve 58 is formed with a pair of spaced sets of radial passages 59 and 61 that register, respectively, with annular chambers 55 and 56, and contains a reciprocable valve plunger 62 formed with an annular groove 63 and a pair of lands 64 and 65. Valve plunger 62 and valve sleeve 58 are biased to the left and right, respectively, to a relative supply position, in which groove 63 interconnects radial passages 59 and 61, by a pair of coil compression springs 66 and 67. Spring 66 is seated on a cup-shaped member 68 that is slidable in the valve bore and whose longitudinal position can be adjusted by a screw 69. It will be apparent from the description of operation that changes in the position of seat 68 varies the operating pressure at which the override control action occurs.

Rightward movement of valve plunger 62 is effected by a pair of override motors 71 and 72. The working chamber 71a of motor 71 is connected with the conduit 19 of relief circuit 13 and, therefore, this motor continuously exerts on valve plunger 62 a force proportional to the pressure in the high pressure side of the closed transmission circuit. Working chamber 72a of motor 72 is connected by a conduit 73 with the outlet chamber of a pressure regulating valve 74 described below. Leftward movement of valve sleeve 58 is effected by a follow-up connection 75, including the follow-up connection 52 which actuates valve sleeve 36 of the primary control valve 28, a cam 76 connected to rotate with crank 53 about pivot 54, and a cam follower 77 which is carried by a lever 78 whose upper end is received in a slot formed in the right end of valve sleeve 58 and whose lower end is pivoted at 79. The active surface 76a of cam 76 is so shaped that lever 78 assumes its maximum clockwise position with respect to pivot 79, and consequently, valve sleeve 58 assumes its extreme rightward position, when cam plate 23 is in the zero displacement position. Movement of the cam plate 23 away from this position in either direction causes cam surface 76a and follower 77 to pivot lever 78 in the counterclockwise direction and thus to shift valve sleeve 58 to the left. The shape of surface 76a determines the relationship between the discharge pressure and the displacement of pump 1 maintained by the override control. In cases where the vehicle engine produces sufficient power to exceed the design limitations of the transmission, cam surface 76a is selected to insure against exceeding the power limits of the transmission. In cases where smaller engines are used, the cam profile is so selected that the transmission imposes a constant power demand less than the power output of the engine at idle speed, and thus insures against stalling of the engine. In other installations, such as machine tool applications, the cam is designed to establish a flow versus pressure relationship dictated by the requirements of the mechanism driven by motor 4. The requirements of a particular installation can be satisfied easily by the illustrated transmission by simply changing the cam 76 used in the follow-up connection 75.

The engine 3 used in the preferred embodiment is equipped with a throttle 3a, and it is the function of pressure regulating valve 74 to vary the maximum power demands of the transmission in direct relation to the setting of this throttle. Valve 74 comprises a housing formed with an inlet chamber 81 connected with charge pump conduit 9, an exhaust chamber 82 that communicates with reservoir 22, and an outlet chamber 83 connected with conduit 73 leading to override motor 72. Reciprocable in the housing is a valve plunger 84 formed with an annular groove 85 that is in continuous communication with outlet chamber 83 via axial and radial passages 86 and 87, respectively, and a pair of valve lands 88 and 89. Valve plunger 84 is biased to the illustrated position, in which inlet and outlet chambers 81 and 83 are interconnected by groove 85 and passages 86 and 87, by a coil compression spring 91, and is shifted in the opposite direction, first, to a lap position, in which lands 88 and 89 isolate groove 85 from both the inlet chamber 81 an dthe exhaust chamber 82, and then to a vent position, in which groove 85 registers with exhaust chamber 82, by the outlet pressure in chamber 83 which acts upon its upper end. The lower end of spring 91 is supported by a movable seat 92 which is shifted in spring-expanding and spring-compressing directions by the throttle control lever 93 as the latter moves in engine speed-increasing and engine speed-decreasing directions, respectively. Since the pressure established in outlet chamber 83 varies directly with the preload in spring 91, and thus inversely with the setting of throttle lever 93, it will be apparent that override motor 72, which responds to this outlet pressure and acts in aid of override motor 71, has the effect of raising and lowering and operating pressure level in the transmission circuit as the engine speed increases and decreases, respectively. This throttle position responsive control, therefore, permits close matching of the power output characteristic of engine 3.

Transmission motor 4 is identical to the pump 1 but the manner of controlling its cam plate 23' is vastly different. It is a characteristic of hydraulic units of this type in which the cam plate adjustment axis passes through the point of intersection of the axis of rotation and the plane of the centers of the spherical piston ends, and in which fluid is delivered to and from the cylinders through a stationary valve face that lies in a plane normal to the axis of rotation, that the reaction forces exerted by the pistons urge the cam plate toward minimum displacement position when the unit is operating as a pump and toward the maximum displacement position when the unit is operating as a motor. This reversal of the direction of bias is believed to be attributable to an apparent extension of the high pressure port in the stationary valve face in the direction of rotation. Thus, during normal operation, the cam plate 23' of motor 4 is biased toward the illustrated maximum displacement position. However, during overrun conditions, such, for example, as are produced by rapid deceleration as a result of dynamic braking, the load drives motor 4 as a pump and the cam plate 23' is biased toward the zero displacement position. The illustrated motor control, which follows the teachings in the co-pending application of John E. G. Young, Serial No. 345,146, filed February 17, 1964, takes into account this reversal of direction of the bias on cam plate 23'.

As shown in the drawing, the motor controls include a double-acting piston motor 94 whose right working chamber is continuously vented to reservoir 22 and whose left working chamber 94a is selectively vented and pressurized automatically by motor control valve 95. This valve 95 includes an inlet port 96 connected with charge pump conduit 9, an exhaust port 97 connected with reservoir 22, an outlet port 98 connected with the working chamber 94a of motor 94, and a reciprocable valve plunger 99 which selectively connects the outlet port with the other two ports. This valve plunger 99 is formed with an annular groove 101 which is dimensioned to span the inlet and outlet ports 96 and 98 in the illustrated position of the plunger, and a pair of valve lands 102 and 103. Valve plunger 99 is biased to the right to the illustrated position by a coil compression spring 104, and is shifted in the opposite direction against this bias by a piston motor 105 having a working chamber 105a which is connected by conduit 106 with the high pressure conduit 19 of relief circuit 13.

Since the biasing force acting on cam plate 23' of motor 4 urges it toward maximum displacement position during normal load-driving conditions, and since the right side of motor 94 is continuously vented, it will be apparent that motor 4 normally operates as a fixed displacement motor and that control valve 95 normally has no effect on the position of cam plate 23'. It is only during overrun conditions, in which motor 4 becomes a pump, that the selective venting action of valve 95 can alter the displacement of the motor 4.

Operation

When engine 3 is running, charge pump 8 discharges fluid to conduit 9 and a portion of this output is delivered to the inlet chamber 33 of primary control valve 28 via conduit 9b, chamber 56, radial passages 61, plunger groove 63, radial passages 59, chamber 55, and supply conduit 39. With actuating lever 51 in the illustrated neutral position, this fluid flows to reservoir 22 along two parallel paths, one path comprising radial passages 43, plunger groove 47, radial passages 42 and 41, and chamber 31, and the other path comprising radial passages 43, plunger groove 47, radial passages 44 and 45, and chamber 35. Although these paths are restricted, the backpressure created in chambers 32 and 34, and transmitted to working chambers 27a and 27b, is not sufficient to enable motor 27 to move cam plate 23 away from the zero displacement position against the opposing bias of the reaction forces exerted by pump piston 26. Therefore, cam plate 23 remains in its zero displacement position and the motor 4 is at rest.

In order to drive the vehicle in the forward direction, the operator moves lever 51 in the clockwise direction about its pivot 51a so that valve plunger 46 moves to the left relatively to valve sleeve 36. This movement of the valve plunger causes land 48 to interrupt communication between radial passages 41 and 42 and causes land 49 to interrupt communication between radial passages 43 and 44, with the result that working chamber 27a is pressurized and working chamber 27b is vented. Motor 27 now moves cam plate 23 in the clockwise direction about the axis of trunnion 24 thereby causing pump 1 to deliver fluid under pressure to main conduit 6. This fluid flows through motor 4 and is returned to pump 1 via main conduit 7 and causes the motor to drive the wheels of the vehicle. The rate of flow through the transmission circuit is a function of the angular position of cam plate 23 and, therefore, as the cam plate moves away from the zero displacement position, motor speed increases. Because of the presence of follow-up linkage 52, movement of cam plate 23 shifts valve sleeve 36 to the left to a null position with respect to plunger 46 and interrupts operation of motor 27 when the position of the cam plate corresponds to the position of lever 51. Since the working chambers 27a and 27b of motor 27 communicate with both the supply conduit 39 and the reservoir 22 when plunger 46 and sleeve 36 are in a null position, motor 27 is not hydraulically locked and the reaction forces exerted by pump pistons 26 tend to return cam plate 23 to the zero displacement position. However, since movement of cam plate 23 toward this position is accompanied by rightward movement of valve sleeve 36 relatively to valve plunger 46, working chamber 27a is pressurized and working chamber 27b is vented as soon as the cam plate leaves the position established by lever 51, and the cam plate is returned to that position. It is thus seen that the primary control for cam plate 23 is basically a position-responsive control.

It should be noted here that valve plunger 46 can travel a greater distance from the neutral position than can valve sleeve 36. Therefore, when lever 51 has been moved to the limit of its travel, and cam plate 23 has been moved to its maximum displacement position, valve sleeve 36 will reside in a position to the right of a null position with respect to the valve plunger. Thus, whenever the displacement of pump 1 is a maximum in the forward direction, working chamber 27a will be in free communication with supply conduit 39 and working chamber 27b will be vented.

When the transmission is operating normally in the forward direction, main conduit 6 will be the high pressure conduit and shuttle valve 16 will assume the illustrated position in which this conduit is connected with high pressure relief valve 14 through conduit 19, and main conduit 7 is connected with low pressure relief valve 15 through conduit 21. The pressure in conduit 19 is transmitted to the working chamber 71a of override motor 71 where it develops a force tending to shift valve plunger 62 to the right against the bias of spring 66. As the operating pressure in the transmission circuit rises, override motors 71 and 72 shift valve plunger 62 to the right relatively to sleeve 58, first, to a lap position in which land 64 covers radial passages 59 and thus interrupts communication between supply conduit 39 and charge pump 8, and then to a vent position in which radial passages 59 communicate with exhaust port 57. Assuming for the moment that override motor 72 exerts a constant force on valve plunger 62, the transmission pressure required to shift valve plunger 62 to the lap and vent positions depends upon the preload in and rate of spring 66 and also upon the displacement of pump 1. This last-mentioned dependency is attributable to the fact that as cam plate 23 moves away from and toward the zero displacement position, respectively, the follow-up connection 75 moves valve sleeve 58 to the left and right with respect to valve plunger 62, thereby decreasing and increasing the distance the valve plunger must travel to reach the lap and vent positions. Because of this, the maximum operating pressure established by the override control varies inversely with the displacement of pump 1.

If the operator is in the process of increasing the displacement of pump 1, and thus valve sleeve 36 of the primary control valve 28 is to the right of a null position with respect to valve plunger 46, when override motors 71 and 72 shift valve plunger 62 of override valve 29 to the lap position, the interruption of flow to supply conduit 39 causes motor 27 to stop. Since valves 28 and 29 prevent flow from working chamber 27a, motor 27 is hydraulically locked and holds cam plate 23 in its current position. When the load on the motor 4, and consequently the pressure in the circuit, decreases, spring 66 will move valve plunger 62 to the left relatively to sleeve 58 and again open the supply path to working chamber 27a. Motor 27 now continues to shift cam plate 23 toward the position selected by lever 51, and will actually move it to that position unless the leftward movement of valve sleeve 58 produced by follow-up connection 75 recreates a lap condition at valve 29. In this case, of course, motor 27 will again stop until the overload is relieved.

If, on the other hand, the primary control valve 28 is in a null position when valve plunger 62 is shifted to a lap position, the fluid in working chamber 27a can escape to reservoir 22 through the restricted path defined by conduit 37, chamber 32 and radial passages 42 and 41, and cam plate 23 will commence to float toward the zero displacement position under the action of the biasing forces exerted by pistons 26. However, since this movement of the cam plate shifts valve sleeve 36 to the right with respect to plunger 46 and interrupts communication between working chamber 27a and reservoir 22, and also, through follow-up connection 75, allows spring 67 to shift valve sleeve 58 to a supply position with respect to valve plunger 62 and re-open the supply path to conduit 39, motor 27 moves cam plate 23 back to its original position. It is thus seen that when override control valve 29 is in its lap position it prevents the primary control from increasing the displacement of pump 1, but does not prevent that control from maintaining the displacement at its current level.

When the operating pressure in the closed transmission circuit rises to an excessive value, override motor 71 shifts valve plunger 62 to its vent position. If, at this time, valve sleeve 36 of the primary control valve 28 is to the right of a null position with respect to valve plunger 46, working chamber 27a will be vented immediately to reservoir 22 through a path comprising conduit 37, chamber 32, radial passages 42, plunger groove 47, radial passages 43. chamber 33, conduit 39, chamber 55, radial passages 59 and exhaust port 57, and the reaction forces exerted by pistons 26 will move cam plate 23 in the displacement decreasing direction. This movement causes follow-up connection 75 to allow spring 67 to shift valve sleeve 58 to the right and continues until that sleeve assumes a lap position with respect to valve plunger 62. At this time, flow from working chamber 27a will be interrupted and motor 27 will hold cam plate 23 in its reduced displacement position. The displacement reducing effect of override valve 29 is essentially the same in the case where valve 28 is in a null position when valve plunger 62 moves to a vent position except that initially the flow from working chamber 27a is restricted by land 48. In either case, a further rise in the pressure causes override motor 71 to move valve plunger 62 to the right relatively to the valve sleeve 58 and again open a vent path from working chamber 27a and allow the biasing forces acting on cam plate 23 to move it the displacement-reducing direction to a new reduced displacement position. If the overpressure condition is severe enough, the override control will cause the cam plate 23 to move to the zero displacement position. On the other hand, if the operating pressure decreases, spring 66 will move valve plunger to the left relatively to sleeve 58 to a supply position in which plunger groove 63 interconnects radial passages 59 and 61 and working chamber 27a is pressurized. In this case, motor 27 moves cam plate 23 back toward the displacement position established by lever 51.

It should be noted, that when primary valve 28 is in a null position when override valve 29 is shifted to the vent position, the rate at which cam plate 23 moves toward a reduced displacement position is retarded slightly due to the flow restriction created by land 48 at the radial passages 42. Normally, this delay is of no consequence, but when cam plate 23 is in maximum displacement position, and consequently, the transmission is operating at maximum speed for the prevailing engine speed, a severe overpressure condition might result in damage to some of the components. Because of this possibility, the primary control valve 28 is so designed that when lever 51 is in the maximum displacement position, it places valve plunger 46 in a position to the left of the limiting leftward position of valve sleeve 36. With this arrangement, working chamber 27a is in free communication with supply conduit 39 whenever cam plate 23 is in maximum displacement position and thus can be exhausted quickly as soon as the valve plunger 62 of the override valve 29 assumes a vent position.

It will be observed that the relationship between the movement of valve sleeve 58 and the movement of cam plate 23 determines the limiting pressure versus flow characteristic of the transmission and depends upon the shape of cam surface 76a. In some cases, the cam surface is a smooth, continuous curve designed to render constant the product of pressure and flow, and thus causes the override control to serve as a constant horsepower control. This kind of control is employed when the transmission is used, as in the illustrated embodiment, to drive the propelling wheels of a vehicle. In other cases, such as drives for machine tools, the cam surface is simply provided with a step so that the transmission operates either at high speed and low pressure, as for example, during rapid traverse of the controlled member, or at low speed and high pressure, as during a work cycle. In any case, the desired flow versus pressure characteristic can be obtained easily merely by changing the cam 76 and without affecting the other components of the control circuits.

As mentioned earlier, the override valve 29 also is actuated by the override motor 72 whose shifting force varies with the output pressure of regulating valve 74. A portion of the fluid discharged by charge pump 8 passes into the inlet chamber 81 of this valve 74 via conduit 9, and then flows through passages 87 and 86, chamber 83 and conduit 73 to the working chamber 72a of motor 72. The pressure in outlet chamber 83 acts upon the upper end of valve plunger 84 and develops a force that urges the valve plunger downward against the opposing bias of spring 91. When the pressure in the outlet chamber rises to the regulated value, determined by the setting of spring 91, valve plunger 84 is moved to a lap position in which plunger groove 85, and consequently outlet chamber 83, are isolated from both inlet chamber 81 and exhaust chamber 82. This regulated pressure in outlet chamber 83 is transmitted to working chamber 72a through conduit 73 where it develops a shifting force that acts in aid of the one developed by override motor 71. If the override motors should move valve plunger 62, and thus tend to reduce the pressure in working chamber 72a and in outlet chamber 83, spring 91 will shift valve plunger 84 upward and again open a supply path from inlet chamber 81 to outlet chamber 83. When the pressure in the last mentioned chamber is restored to the regulated value, valve plunger 84 moves back to the lap position.

The setting of spring 91 depends upon the position of seat 92 which is under the control of throttle lever 93. When the throttle lever is in its idle position, the preload in spring 91 is a maximum, and consequently, the regulated pressure in outlet chamber 83 and in working chamber 72a is a maximum. Under these conditions, a relatively low operating pressure in working chamber 71a will shift valve plunger 62 to its lap and vent positions. Therefore, at a time when the output power of the engine is low, so too is the power demand of the transmission. As the engine throttle is advanced, spring seat 92 moves in the spring-expanding direction and reduces the preload in spring 91. Now the pressure in outlet chamber 82, which had been holding valve plunger 84 in the lap position, shifts the plunger to the vent position in which plunger groove 85 registers with exhaust chamber 82. This action permits some fluid to escape from outlet chamber 83 and reduces the pressure in that chamber. When the outlet pressure reduces an amount corresponding to the change in spring loading, valve plunger 84 moves back to the lap position. From this, it can be seen that as the throttle is advanced to thereby increase the speed and output power of engine 3, the regulated pressure transmitted to working chamber 72a, and the force exerted by motor 72, decrease, and therefore the maximum permissible transmission pressure increases. The throttle-responsive control is so designed that the power demands of the transmission at all speeds of engine 3 are always safely below the power output of the engine.

In order to drive the load in the reverse direction, the operator moves lever 51 in the counterclockwise direction about the pivot 51a to thereby shift valve plunger 46 to the right from the illustrated neutral position. This movement of the valve plunger causes land 48 to interrupt communication between radial passages 42 and 43 and causes land 49 to interrupt communication between radial passages 44 and 45. Now working chambers 27b and 27a are pressurized and vented, respectively, and motor 27 moves cam plate 23 in the counterclockwise direction about the axis of trunnion 24 thereby causing the pump 1 to discharge fluid under pressure to main conduit 7. When cam plate 23 reaches the position called for by lever 51, follow-up connection 52 will have moved valve sleeve 36 to the right to a null position with respect to valve plunger 46 and motor 27 will stop. As in the case of forward operation, valve sleeve 36 cannot follow valve plunger to the latter's maximum displacement position and, therefore, when cam plate is in its maximum displacement position, the sleeve 36 will be in a position to the left of null position so that working chamber 27b will be in free communication with supply conduit 39. As explained above, the primary control maintains cam plate 23 in the position selected by the operator as long as override valve 29 remains in its supply position.

When the transmission is operating in reverse, main conduit 7 is the high pressure conduit, and shuttle valve 13 shifts to the left to connect this conduit with conduit 19 and to connect main conduit 6 with conduit 21. Since working chamber 71a of override motor 71 still receives the operating pressure of the transmission, the override control functions in the same manner in reverse as it does in forward.

When the transmission is operating normally in either forward or reverse, motor 4 drives the vehicle and the reaction forces of its pistons 26' urge cam plate 23' to the illustrated maximum displacement position. Therefore, even though the pressure in the high pressure side of the closed circuit causes motor 105 to shift valve plunger 99, this action has no effect on the displacement of the motor. However, when the vehicle overruns motor 4, this unit becomes a pump and its controls function to reduce its displacement and prevent the occurrence of damaging pressure and flow conditions. In order to illustrate this effect, it will be assumed that the overrun condition occurs while the transmission is operating in the forward direction as a result of rapid movement of lever 51 toward its neutral position. When the motor 4 is overrun and commences to pump, it discharges fluid under pressure to main conduit 7 and raises the pressure in this conduit above that in main conduit 6. As a result of this reversal in the pressures in conduits 6 and 7, shuttle valve 13 shifts to the left from the illustrated position and connects main conduits 6 and 7 with the low and high pressure relief conduits 21 and 19, respectively. When the pressure in main conduit 7 reaches a predetermined value, motor 105 shifts valve plunger 99 to the left to a position in which land 103 blocks inlet port 96 and port 98 is connected with exhaust port 97. Since, at this time, cam plate 23' is being biased toward the zero displacement position, venting of working chamber 94a by valve 95 allows the cam plate to move in this direction. When the displacement of motor 4 has been reduced sufficiently to stabilize the pressure in main conduit 7, spring 104 shifts plunger 99 to the right and causes land 103 to interrupt the exhaust path from working chamber 94a to reservoir 22. Motor 94 now becomes hydraulically locked and holds cam plate 23' in the reduced displacement position. The predetermined pressure at which valve 95 vents working chamber 94a is not greater than the pressure required by override motor 71 to shift valve 29 to a vent position when the pressure in override motor 72a is a minimum and cam plate 23 is in maximum displacement position. Thus, it can be seen that if the maximum displacement of motor 4 is equal to or less than the maximum displacement of pump 1, the transmission circuit will not be subjected to any more severe operating conditions during overrun than it is during normal operation at the maximum speed of engine 3.

As the dynamic braking afforded by the transmission circuit decelerates the load, the pressure in main conduit 7 will tend to decrease. As it does so, spring 104 shifts valve plunger 99 back to its supply position. When the pressure is restored to said predetermined value, motor 105 shifts valve plunger 99 to the left and interrupts flow to working chamber 94a. During this period of deceleration, the controls for motor 4 continuously vary the position of cam plate 23' to afford the maximum degree of dynamic braking permitted by the design limitations of the transmission. When the overrun condition subsides, cam plate 23' will be in its maximum displacement position, motor 4 will again be driving the load, conduit 6 will again become the high pressure conduit, and shuttle valve 13 will shift back to its illustrated position.

It should be apparent that the motor controls will perform in the same way as that just described in order to prevent the occurrence of damaging operating conditions when an overrun is encountered while the transmission is operating in reverse.

As stated previously, the drawing and description relate only to the preferred embodiment of the invention. Since changes can be made in the structure of this embodiment without departing from the inventive concept, the following claims should provide the sole measure of the scope of the invention.

What I claim is:

1. A hydrostatic transmission comprising
(a) a variable displacement pump having a displacement control element movable between minimum and maximum displacement positions and biased toward the minimum displacement position;
(b) a hydraulic motor;
(c) a pair of main conduits connecting the pump and motor in a closed circuit;

(d) a fluid pressure control motor for moving the displacement control element toward maximum displacement position;

(e) a control valve having an outlet passage connected with the control motor, a supply passage, an exhaust passage, and a pair of movable valve members, each of the valve members being movable in reverse directions from a first relative position in which the outlet passage communicates with both the inlet and exhaust passages, relative movement of the members in one direction with respect to the first position serving to isolate the outlet passage from the supply passage and relative movement of the members in the opposite direction with respect to the first position serving to isolate the outlet passage from the exhaust passage;

(f) means for shifting one of the members of the control valve;

(g) a follow-up connection between the other member of the control valve and the displacement control element arranged to shift that member toward the first relative position with respect to the said one valve member;

(h) a source of control fluid under pressure and a reservoir;

(i) an override valve for selectively connecting the supply passage with the source and the reservoir, the override valve including a pair of valve members each of which is movable in reverse directions from a first position in which the supply passage is isolated from both the source and the reservoir, relative movement of the members in one direction with respect to the first position serving to connect the supply passage with the source and relative movement of the members in the opposite direction with respect to the first position serving to connect the supply passage with the reservoir;

(j) pressure responsive motor means for shifting one of the valve members of the override valve in said opposite relative direction; and (k) follow-up means interconnecting the other of the movable members of the override valve and the displacement control element and arranged to move said other member in said one and said opposite relative directions, respectively, as the displacement control element moves toward and away from the minimum displacement position, (l) said follow-up means including a cam and follower linkage, whereby the relationship between valve member movement and displacement control element movement is dependent upon the shape of the cam.

2. A hydrostatic transmission as defined in claim 1 which includes
  (a) an engine connected to drive the pump;
  (b) a throttle movable in speed-increasing and speed-decreasing directions for controlling the speed of the engine;
  (c) second pressure responsive motor means connected with the same member of the override valve as the first motor means and arranged to shift said member in said opposite relative direction; and
  (d) a pressure regulating valve connected with the second motor means, the source and the reservoir and actuated by movement of the throttle, the pressure regulating valve serving to raise and lower the pressure in the second motor means as the throttle moves in speed-decreasing and speed-increasing directions, respectively.

3. A hydrostatic transmission as defined in claim 2 in which the pressure regulating valve comprises
  (a) an inlet passage connected with the source, an exhaust passage connected with the reservoir and an outlet passage connected with the second motor means;
  (b) a movable valve member having first and second positions in which the outlet passage is connected with the inlet and exhaust passages, respectively, and an intermediate position in which the outlet passage is isolated from both the inlet passage and the exhaust passage;
  (c) a spring urging the valve member toward the first position;
  (d) means responsive to the pressure in the outlet passage for urging the valve member toward the second position; and
  (e) a seat for the spring means connected with the throttle and movable in spring-compressing and spring-expanding directions, respectively, as the throttle is moved in speed-decreasing and speed-increasing directions.

4. A hydrostatic transmission as defined in claim 1 wherein the range of movement of said one member of the control valve from the first position in said opposite relative direction is greater than the range of movement of said other member of the control valve from the first position in said one relative direction.

5. A hydrostatic transmission comprising
  (a) a variable displacement pump having a displacement control element movable between maximum displacement positions on opposite sides of a zero displacement position toward which it is biased for controlling the displacement of and the direction of flow through the pump;
  (b) a hydraulic motor;
  (c) a pair of main conduits connecting the pump and motor in a closed circuit;
  (d) a double-acting piston motor for moving the displacement control element;
  (e) a control valve having a housing containing first and second outlet passages connected with opposite sides of the double-acting piston motor, a supply passage, exhaust passage means and a pair of valve members each of which is movable in reverse directions from a relative null position in which each outlet passage communicates with both the supply passage and the exhaust passage means, relative movement of the members in one direction with respect to the null position serving to interrupt communication between the first outlet passage and the supply passage and to interrupt communication between the second outlet passage and the exhaust passage means, and relative movement of the members in the opposite direction with respect to the null position serving to interrupt communication between the first outlet passage and the exhaust passage means and to interrupt communication between the second outlet passage and the supply passage;
  (f) means for shifting one of the members of the control valve in opposite directions from a neutral position relative to the housing;
  (g) a follow-up connection between the other member of the control valve and the displacement control element arranged to shift that member toward the null position with respect to the said one valve member and which establishes a null position between these members when said one member is in the neutral position;
  (h) a source of control fluid under pressure and a reservoir;
  (i) an override valve for selectively connecting the supply passage with the source and the reservoir, the override valve including a pair of valve members each of which is movable in reverse direction from a first position in which the supply passage is isolated from both the source and the reservoir, relative movement of the members in one direction with respect to the first position serving to connect the supply passage with the source and relative movement of the members in the opposite direction with respect to the first position serving to connect the supply passage with the reservoir;

(j) motor means responsive to the operating pressure in the closed circuit for shifting one of the valve members of the override valve in said opposite relative direction as the pressure rises; and (k) follow-up means interconnecting the other of the movable members of the override valve and the displacement control element and arranged to move said other member in said one and said opposite relative directions, respectively, as the displacement control element moves toward and away from the minimum displacement position, (l) said follow-up means including a cam movable with the displacement control element and a cam follower for actuating the said other movable member of the override valve, the cam having a first portion arranged to cause the follower to displace the valve member a maximum distance in said one direction when the displacement control element is in zero displacement position, and second and third portions disposed at opposite sides of the first portion and arranged to cause the follower to shift the valve member in said opposite direction as the displacement control element moves away from the zero displacement position toward one or the other of the maximum displacement positions.

6. A hydrostatic transmission as defined in claim 5

(a) which includes
  (1) a low pressure relief valve,
  (2) a high pressure relief valve having an outlet connected with the inlet of the low pressure relief valve, and
  (3) a shuttle valve responsive to the differential between the pressures in the two main conduits for connecting the higher pressure conduit with the low pressure relief valve and connecting the higher pressure conduit with the high pressure relief valve; and (b) wherein the motor means includes
  (1) a fluid pressure motor arranged to shift said one valve member of the override valve in said opposite direction,
  (2) means biasing that valve member in said one direction, and
  (3) the shuttle valve, whereby the fluid pressure motor is connected with the higher pressure conduit by the shuttle valve.

7. A hydrostatic transmission as defined in claim 5 which includes (a) an engine connected to drive the pump;
(b) a throttle movable in speed-increasing and speed-decreasing directions for controlling the speed of the engine;
(c) second fluid pressure motor means connected with the said one member of the override valve and arranged to shift said member in the same direction as the first motor means; and
(d) a pressure regulating valve connected with the second motor means, the source and the reservoir and actuated by movement of the throttle, the pressure regulating valve serving to raise and lower the pressure in the second motor means as the throttle moves in speed-decreasing and speed-increasing directions, respectively.

8. A hydrostatic transmission as defined in claim 5 wherein the range of movement of said one member of the control valve in either direction from neutral position is greater than the corresponding range of movement of said other member of the control valve.

9. A hydrostatic transmission as defined in claim 5 in which the hydraulic motor is of the rotary cylinder barrel, longitudinally reciprocating piston type having a cam plate which is movable between minimum and maximum displacement positions, the cam plate being biased by the piston reaction forces toward maximum displacement position when the motor is driving a load and toward the minimum displacement position when the load is driving the motor, and including (a) a fluid pressure actuating motor arranged to move the cam plate toward maximum displacement position;
(b) a second control valve having an outlet passage connected with the actuating motor, an inlet passage connected with the source, an exhaust passage connected with the reservoir, and a movable valve member having first and second positions in which, respectively, the outlet passage is connected with the inlet and exhaust passages and an intermediate position in which the outlet passage is isolated from both the inlet and the exhaust passage;
(c) means biasing the movable valve member toward the first position;
(d) a fluid pressure valve motor for shifting the movable valve member toward the second position; and
(e) means for connecting the valve motor with whichever of the main conduits is at the higher pressure,
(f) the valve motor being designed to shift the movable valve member to the second position at a pressure not greater than that required by the motor means to shift the override valve member to vent position when the displacement control element is in either maximum displacement position.

No references cited.